(12) United States Patent
Li et al.

(10) Patent No.: US 9,543,761 B2
(45) Date of Patent: Jan. 10, 2017

(54) HOME ENERGY CONTROL SYSTEM AND CONTROLLING METHOD THEREOF

(75) Inventors: Bo Li, Shenzhen (CN); Xiaofeng Shen, Shenzhen (CN); Jianhua Zhang, Shenzhen (CN)

(73) Assignees: SHENZHEN BYD AUTO R&D COMPANY LIMITED, Shenzhen (CN); BYD COMPANY LIMITED, Shenzhen (CN)

(*) Notice: Subject to any disclaimer, the term of this patent is extended or adjusted under 35 U.S.C. 154(b) by 546 days.

(21) Appl. No.: 13/581,095

(22) PCT Filed: Mar. 30, 2011

(86) PCT No.: PCT/CN2011/072319
§ 371 (c)(1),
(2), (4) Date: Aug. 24, 2012

(87) PCT Pub. No.: WO2011/120435
PCT Pub. Date: Oct. 6, 2011

(65) Prior Publication Data
US 2012/0316690 A1    Dec. 13, 2012

(30) Foreign Application Priority Data
Mar. 31, 2010   (CN) .......................... 2010 1 0141039

(51) Int. Cl.
*G06F 1/26* (2006.01)
*H02J 3/32* (2006.01)
(Continued)

(52) U.S. Cl.
CPC ................ *H02J 3/32* (2013.01); *H02J 7/0055* (2013.01); *H02J 7/35* (2013.01)

(58) Field of Classification Search
CPC ........................................................ G06F 1/26
(Continued)

(56) References Cited

U.S. PATENT DOCUMENTS 5,929,538 A * 7/1999 O'Sullivan et al. ............ 307/66
6,304,006 B1 * 10/2001 Jungreis ......................... 307/64
(Continued)

FOREIGN PATENT DOCUMENTS

| CN | 2859897 Y | 1/2007 |
|---|---|---|
| CN | 1972068 A | 5/2007 |

(Continued)

OTHER PUBLICATIONS

International Search Report for Application No. PCT/CN2011/072319 dated Jul. 7, 2011.

*Primary Examiner* — Tejal Gami
(74) *Attorney, Agent, or Firm* — Anova Law Group, PLLC (57) ABSTRACT

A method of controlling a home energy control system includes controlling the system to run in at least one of a new energy generating mode, a grid-connected inverter mode and an off-grid inverter mode after mode conflict check. In the new energy generating mode, a new energy generating unit is controlled to generate power to charge an energy storage unit. In the grid-connected inverter mode, the energy storage unit supplies power to a power grid or is charged by the power grid according to the status of the energy storage unit and power consumption of the power grid. In the off-grid inverter mode, household devices are supplied with power from the energy storage unit according to the status of the energy storage unit under the control of an off-grid inverter. A home energy control system is also provided.

16 Claims, 5 Drawing Sheets

(51) Int. Cl.
*H02J 7/00* (2006.01)
*H02J 7/35* (2006.01)

(58) Field of Classification Search
USPC .................................................. 700/292, 297
See application file for complete search history.

(56) References Cited

U.S. PATENT DOCUMENTS

| | | | |
|---|---|---|---|
| 6,914,418 B2* | 7/2005 | Sung | 320/140 |
| 7,701,087 B2* | 4/2010 | Eckroad et al. | 307/46 |
| 7,800,247 B2* | 9/2010 | Chang et al. | 307/46 |
| 2003/0047209 A1* | 3/2003 | Yanai et al. | 136/291 |
| 2004/0207366 A1 | 10/2004 | Sung | |
| 2006/0158037 A1* | 7/2006 | Danley et al. | 307/64 |

FOREIGN PATENT DOCUMENTS

| | | |
|---|---|---|
| CN | 201263091 Y | 6/2009 |
| CN | 201278465 Y | 7/2009 |
| CN | 201328089 Y | 10/2009 |
| CN | 101588078 A | 11/2009 |
| CN | 101656422 A | 2/2010 |
| CN | 101677188 A | 3/2010 |
| JP | 11332125 A | 11/1999 |

* cited by examiner

HOME ENERGY CONTROL SYSTEM AND CONTROLLING METHOD THEREOF

CROSS-REFERENCE TO RELATED APPLICATIONS

The present application is a national phase entry under 35 U.S.C. §371 of International Application No. PCT/CN2011/072319 filed Mar. 30, 2011, published in English, which claims priority from Chinese Patent Application No. 201010141039.7, filed Mar. 31, 2010, all of which are incorporated herein by reference.

FIELD

The present disclosure relates to energy control, more particularly to a home energy control system and a method of controlling the same.

BACKGROUND

Recently, the disadvantages due to mass consumption of non-renewable resources stands out gradually, the deficiency of natural resources, environmental pollution and global greenhouse effect lead more attentions paid to the development of new energy resources. Some countries such as America have made some allowance policies to encourage the use of the new energy resources. The home energy control system which may utilize new energy resources such as solar energy in large scale has been developed. Conventional home energy control systems mainly transform new energy resources such as solar energy into electricity directly by voltage transforming and stabilizing devices. The use of the conventional home energy control system may be limited by weather conditions, the generated electricity may not be enough to satisfy the needs of the user, and the unused power may also be wasted.

The controlling method of the conventional home energy control system is simple without considering the work differences between the high/low peak period of the power grid etc. in addition to the protection of energy storage units.

SUMMARY

The present disclosure is directed to solve at least one of the problems existing in the prior art. Accordingly, a home energy control system and a method of controlling the same are provided.

According to an aspect of the present disclosure, a method of controlling a home energy control system may be provided. The method may comprise the steps of controlling the system to run in at least one of the following modes: a new energy generating mode, a grid-connected inverter mode and an off-grid inverter mode after mode conflict check, in which A) in the new energy generating mode, a new energy generating unit is controlled to generate power to charge an energy storage unit; B) in the grid-connected inverter mode, the energy storage unit supplies power to a power grid or is charged by the power grid via a grid-connected inverter according to the status of the energy storage unit and power consumption of the power grid; and C) in the off-grid inverter mode, household devices are supplied with power from the energy storage unit according to the status of the energy storage unit under the control of an off-grid inverter.

According to another aspect of the present disclosure, a home energy control system may be provided. The home energy control system may comprise: an energy storage unit configured to store energy; a grid-connected inverter connected with the energy storage unit which is configured to transmit power from the energy storage unit to a power grid and/or transmit power from the power grid to the energy storage unit; an off-grid inverter configured to transmit power from the energy storage unit to household devices; a new energy generating unit configured to generate power domestically to charge the energy storage unit; and a controller connected with the energy storage unit, the grid-connected inverter, the new energy generating unit, and the off-grid inverter respectively, the controller being configured to control the energy storage unit, the grid-connected inverter, the off-grid inverter and the new energy generating unit to run in a grid-connected mode, an off-grid inverter mode and/or a new energy generating mode respectively.

With the home energy control system and the method of controlling the same according to an embodiment of the present disclosure, the excess power generated by the new energy generating unit may be stored in the energy storage unit, and the operation of the home energy control system may be effectively controlled according to different external conditions, thus expanding the application scope of the system in addition to the effective utilization of the new energy resources and protection of the environment.

Additional aspects and advantages of the embodiments of present disclosure will be given in part in the following descriptions, become apparent in part from the following descriptions, or be learned from the practice of the embodiments of the present disclosure.

BRIEF DESCRIPTION OF THE DRAWINGS

The foregoing and other features and advantages of the disclosure will become apparent and more readily appreciated from the following descriptions taken in conjunction with the drawings in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Figure 1:
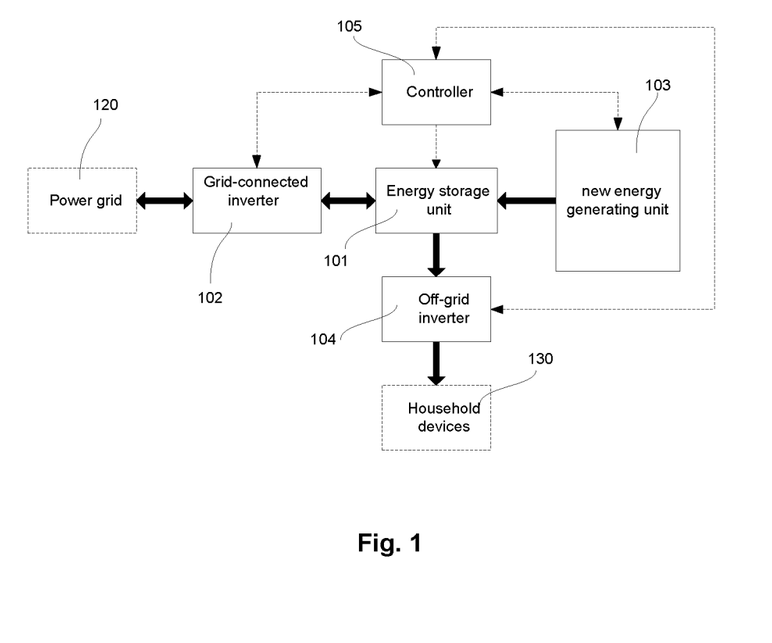
FIG. 1 is a schematic diagram of a home energy control system according to an embodiment of the present disclosure, in which the dash lines represent the communicating relationships and the solid arrows represent the flow directions of the electric energy.

As shown in FIG. 1, in one embodiment of the present disclosure, the home energy control system may be connected with a power grid 120 and household devices 130.

The home energy control system may comprise: an energy storage unit 101, a grid-connected inverter 102, an off-grid inverter 104, a new energy generating unit 103, and a controller 105.

The grid-connected inverter 102 is connected with the energy storage unit 101, and configured to transmit power from the energy storage unit 101 to the power grid 120 and/or transmit power from the power grid 120 to the energy storage unit 101.

The off-grid inverter 104 is configured to transmit power from the energy storage unit 101 to the household devices 130. The new energy generating unit 103 is configured to generate power domestically from new energy resources to charge the energy storage unit 101. The energy storage unit 101 is connected with the controller 105, the grid-connected inverter 102, the off-grid inverter 104, and the new energy generating unit 103 respectively, and configured to store electric energy.

The controller 105 is connected with the energy storage unit 101, the grid-connected inverter 102, the new energy generating unit 103, and the off-grid inverter 104 respectively, and configured to control the energy storage unit 101, the grid-connected inverter 102, the off-grid inverter 104 and the new energy generating unit 103 to run in a grid-connected mode, an off-grid inverter mode and/or a new energy generating mode according to the status of the energy storage unit 101, the power consumption status of the power grid 120 and the power generation condition of new energy resources.

The grid-connected mode is defined by: the energy storage unit 101 supplying power to the power grid 120 or the power grid 120 charging the energy storage unit 101 controlled by the grid-connected inverter 102 according to the status of the energy storage unit 101 and power consumption of the power grid 120.

The off-grid inverter mode is defined by: household devices 130 being supplied with power from the energy storage unit 101 according to the status of the energy storage unit 101.

The new energy generating mode is defined by: the new energy generating unit 103 charging the energy storage unit 101 according to the power generating status of the new energy generating unit 103.

The controller 105 is further configured to run the system in a manual operating mode.

When in the manual operating mode, if manual modulation is triggered, the energy storage unit 101, the grid-connected inverter 102, the off-grid inverter 104 and the new energy generating unit 103 are modulated manually by the controller 105; or if no manual modulation is triggered, the controller controls the system to run in at least one of the grid-connected mode, the off-grid inverter mode and the new energy generating mode after mode conflict check.

If the manual modulation conflicts with the new energy generating mode, the manual modulation is executed and the new energy generating mode is stopped by the controller, otherwise, the manual modulation and the new energy generating mode are executed simultaneously. If the manual modulation conflicts with the grid-connected inverter mode, the manual modulation is executed and the grid-connected inverter mode is stopped by the controller, otherwise the manual modulation and the grid-connected inverter mode are executed simultaneously. If the manual modulation conflicts with the off-grid inverter mode, the manual modulation is executed and the off-grid inverter mode is stopped by the controller, otherwise the manual modulation and the off-grid inverter mode are executed simultaneously.

The controller is configured to run the system in a fault determining mode in which it is determined whether the temperature, the humidity, the voltage, and SOC of the energy storage unit is normal before the controller controls the system to run in the grid-connected mode, the off-grid inverter mode and/or the new energy generating mode. In the fault determining mode, if it is determined that there is a fault in the energy storage unit, the control system is stopped by the controller, otherwise the controller controls the system to run in the at least one of the grid-connected mode, the off-grid inverter mode and the new energy generating mode.

When the system is controlled to run in the grid-connected mode, if it is determined by the controller that the power grid is in a high peak, the energy storage unit supplies power to the power grid intermittently or continuously under the control of the grid-connected inverter based on the current SOC of the energy storage unit, otherwise if it is determined by the controller that the power grid is in a low peak, the energy storage unit is charged by the power grid intermittently or continuously under the control of the grid-connected inverter based on the current SOC of the energy storage unit.

When it is determined by the controller that the power grid is in a high peak and the current SOC of the energy storage unit is greater than the a first preset value $SOC_{max}$ the energy storage unit charges the power grid under the control of the grid-connected inverter, otherwise the energy storage unit is charged by the power grid intermittently under the control of the grid-connected inverter until the current SOC of the energy storage unit is greater than the first preset value $SOC_{min}$.

When it is determined by the controller that the power grid is in a low peak and the current SOC of the energy storage unit is smaller than a second preset value $SOC_{max}$ which is larger than the first preset value $SOC_{min}$ the energy storage unit is charged by the power grid under the control of the grid-connected inverter. When it is determined by the controller that the power grid is in a low peak and the current SOC of the energy storage unit is no smaller than the second preset value $SOC_{max}$, the energy storage unit supplies power intermittently to the power grid under the control of the grid-connected inverter.

The household devices are switched to be powered from the energy storage unit to the power grid under the control of the off-grid inverter when it is determined by the controller that the current SOC of the energy storage unit is lower than a third preset value $SOC_{low}$ which is larger than the first preset value $SOC_{min}$ and smaller than the second preset value SOC.

According to an embodiment of the present disclosure, the off-grid inverter mode, the grid-connected mode and the new energy generating mode are executed by the controller to run in series, in parallel or in series and parallel respectively after the mode conflict check.

According to an embodiment of the present disclosure, the energy storage unit 101 may be a variety of suitable power storage devices such as rechargeable battery packs etc.

The grid-connected inverter 102 may be a variety of suitable bidirectional inverters configured to transmit power from the energy storage unit 101 to the power grid 120 and transmit power from the power grid 120 to the energy storage unit 101.

The off-grid inverter 104 may be one of the common inverters configured to transmit power from the energy storage unit 101 to the household devices 130. The off-grid inverter 104 may be always turned on, so that the household devices 130 may be started by operating their own switches.

In order to make the home energy control system used and tested normally in different areas, the controller 105 may further comprise a Man-Machine interface configured to set various parameters and input manual operating commands.

Besides the Man-Machine interface, the controller 105 may further comprise other controlling modules configured to assist data processing or connect the Man-Machine interface with other modules. The other modules may be a variety of suitable controlling devices such as single-chip microcomputers (SCMs) or various control chips.

In order to prevent related controlling parameters of the home energy control system from being improperly set by unprofessional persons, in some embodiments of the present disclosure, the controller 105 may be encrypted, such as by an administrator password, and the controlling parameters of the home energy control system may not be set and/or changed unless the correct administrator password has been input. Such controlling parameters of the home energy control system may include the working periods and conditions of the new energy generating unit 103 when the home energy control system is automatically operated, and other controlling parameters such as a second preset value $SOC_{max}$ and a first preset value $SOC_{min}$ of the energy storage unit 101.

The $SOC_{max}$ may be set as 90%-100% of the state of charge (SOC), and the $SOC_{min}$ may be set as 5%-10% of the SOC, according to different requirements of the user.

A third preset value $SOC_{low}$ is set to prevent the energy storage unit 101 from being over-discharged. The $SOC_{low}$ is smaller than $SOC_{min}$, is set when the energy storage unit 101 is manufactured, and may not be reset thereafter. In some embodiments of the present disclosure, the $SOC_{low}$ may be set as 4%-9% of the SOC.

The $SOC_{max}$, $SOC_{min}$ and $SOC_{low}$ may be set by those skilled in the art according to different energy storage units.

New energy resources are also called as non-conventional energy resources, and are different from conventional energy resources in that they are newly developed or actively researched to be widely used in future replacing conventional energy resources. Such new energy resources may include solar energy, geothermal energy, wind energy, ocean energy, biomass energy, nuclear fusion energy, etc. Accordingly, the new energy generating unit 103 may include a solar energy generating unit, a geothermal energy generating unit, a wind energy generating unit, an ocean energy generating unit, a biomass energy generating unit, a nuclear fusion energy generating unit, etc.

Different power generation time and automatic operating conditions may be set by those skilled in the art according to different natural conditions or natural resources in different areas. For example, the period for power generation from solar energy may be set from 10:00 to 15:00, and when the wind velocity reaches 2.2-15.5 m/s, the new energy generating unit 103 is controlled to generate power from wind.

According to another aspect of the present disclosure, a method of controlling a home energy control system is also provided. According to one embodiment of the present disclosure, as shown in FIGS. 2-5, the method may comprise the steps of controlling the system to run in at least one of the following modes: a new energy generating mode, a grid-connected inverter mode and an off-grid inverter mode after mode conflict check, in which:

A) in the new energy generating mode, a new energy generating unit is controlled to generate power to charge an energy storage unit;

B) in the grid-connected inverter mode, the energy storage unit supplies power to a power grid or is charged by the power grid via a grid-connected inverter according to the status of the energy storage unit and power consumption of the power grid; and C) in the off-grid inverter mode, household devices are supplied with power from the energy storage unit according to the status of the energy storage unit under the control of an off-grid inverter.

The controlling method further comprises a step of controlling the energy system to run in a manual operating mode, in which: D) in the manual operating mode, if manual modulation is desired, the energy storage unit, the grid-connected inverter, the off-grid inverter and the new energy generating unit are modulated manually; and if no manual modulation is desired, at least one of the grid-connected mode, the off-grid inverter mode and the new energy generating mode is executed after the mode conflict check.

The step D) comprises steps of: if the manual modulation is desired, controlling the system to execute the manual modulation; otherwise controlling the system to run in at least one of the new energy generating mode, the grid-connected inverter mode and the off-grid inverter mode.

Figure 2:
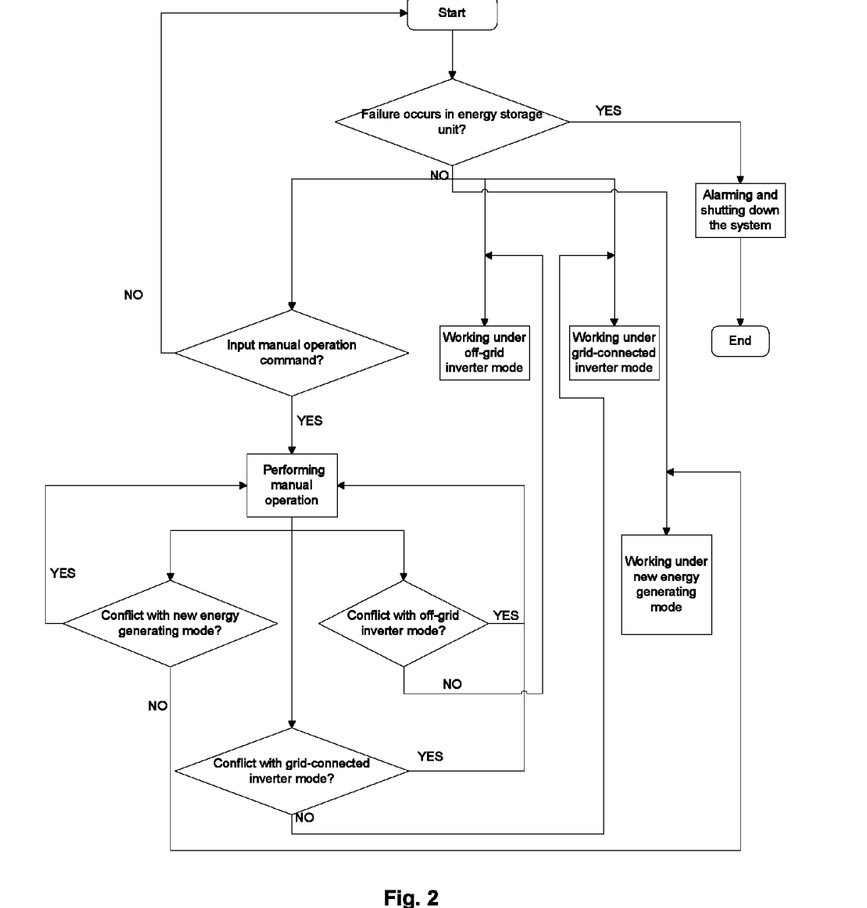
FIG. 2 is a flow chart of a method of controlling a home energy control system according to an embodiment of the present disclosure.

According to one embodiment of the present disclosure, as shown in FIG. 2, the step of controlling the system to execute the manual modulation comprises steps of:

a) determining whether the manual modulation is conflicted with the new energy generating mode;

a-1) if yes, executing the manual modulation and stopping the new energy generating mode; and a-2) otherwise, simultaneously executing the manual modulation and the new energy generating mode.

The home energy control system may be configured to determine whether the manual modulation is conflicted with the off-grid inverter mode and the grid-connected inverter mode. The off-grid inverter mode and the grid-connected inverter mode may continue working and may be automatically stopped when their working conditions are not satisfied. Especially when the manual modulation changes the parameters of the home energy control system, the home energy control system may work according to the newly changed and saved parameters, or according to its original parameters if the newly changed parameters are still not saved in the home energy control system.

According to one embodiment of the present disclosure, as shown in FIG. 2, the step of controlling the home energy control system to execute the manual modulation further comprises steps of:

b) determining whether the manual modulation is conflicted with the grid-connected inverter mode;

b-1) if yes, executing the manual modulation and stopping the grid-connected inverter mode;

b-2) otherwise, simultaneously executing the manual modulation and the grid-connected inverter mode;

c) determining whether the manual modulation is conflicted with the off-grid inverter mode;

c-1) if yes, executing the manual modulation and stopping the off-grid inverter mode;

c-2) otherwise, simultaneously executing the manual modulation and the off-grid inverter mode.

The steps a), b), and c) may be performed in sequence. That is, after the steps a), b), and c) are finished, at least one of the new energy generating mode, the grid-connected inverter mode, and the off-grid inverter mode may be executed, as long as these modes are not conflicted with the manual modulation.

The conflict between the manual modulation and the new energy generating mode, the grid-connected inverter mode or the off-grid inverter mode means that the manual modulation is identical with the new energy generating mode, the grid-connected inverter mode or the off-grid inverter mode, or influences the new energy generating mode, the grid-connected inverter mode or the off-grid inverter mode.

The home energy control system may run in a manual operating mode or an automatic operating mode. Under normal circumstances, the home energy control system may run in the automatic operating mode. The home energy control system may run in the manual operating mode only when manual modulation is desired, meanwhile, the home energy control system may continue running in the automatic operating mode as long as the automatic operating mode is not conflicted with the manual operating mode, or stop running in the automatic operating mode. After executing the manual modulation, the home energy control system may automatically run in the automatic operating mode.

Before the steps A), B), C) and D), the controlling method further comprises a step of controlling the system to run in a fault determining mode in which:

s) it is determined whether the temperature, the humidity, the voltage, and SOC of the energy storage unit is normal before the grid-connected mode, the off-grid inverter mode and/or the new energy generating mode are executed.

Step s) comprises steps of: s-1) if it is determined that there is a fault in the energy storage unit, giving alarm and stopping the system; and s-2) otherwise, controlling the control system to run in at least one of the new energy generating mode, the grid-connected inverter mode, the off-grid inverter mode and the manual operating mode.

The parameters such as the temperature, the humidity, the voltage, and SOC of the energy storage unit may be detected to determine whether there is a fault in the energy storage unit. The parameters and the method for determining the energy storage unit such as a battery pack are known to those skilled in the art, for example, the detecting method of the SOC. The detected parameters are compared with the normal parameters. If the detected parameters are within a normal range, the energy storage unit works normally, otherwise, there is a fault in the energy storage unit.

Normally, the home energy control system runs in the fault determining mode firstly to determine whether there is a fault in the energy storage unit. Only when there is no fault in the energy storage unit, the home energy control system may run in at least one of the new energy generating mode, the grid-connected inverter mode, the off-grid inverter mode and the manual operating mode. The new energy generating mode, the grid-connected inverter mode, the off-grid inverter mode and the manual operating mode may be executed in sequence, or two or three of these modes may be executed simultaneously. If these modes are executed simultaneously, the new energy generating mode, the grid-connected inverter mode and the off-grid inverter mode will not execute the operation of the manual operating mode, and the manual operating mode will not influence normal operations of other modes.

If the home energy control system running in the manual operating mode is controlled to generate power from the new energy generating unit, simultaneously the power grid may be charged by the energy storage unit under the control of the grid-connected inverter. If the home energy control system running in the manual operating mode is controlled to generate power from the solar energy resource, other new energy resources may also be used to generate power and simultaneously the energy storage unit may be charged by the power grid under the control of the grid-connected inverter.

In order to ensure that the home energy control system works safely, the fault determining mode may be executed with the new energy generating mode, the grid-connected inverter mode, the off-grid inverter mode and the manual operating mode simultaneously, thus preventing the potential damage to the energy storage unit caused by the continuous operation of the home energy control system when there is a fault in the energy storage unit.

Further, when the home energy control system is operating, it may also be determine whether there are faults in the new energy generating unit, the off-grid inverter and the grid-connected inverter. If yes, one of the new energy generating unit, the off-grid inverter and the grid-connected inverter may be stopped, or the whole home energy control system may be stopped.

The conditions for determining whether there are faults in the new energy generating unit, the off-grid inverter and the grid-connected inverter may be set by those skilled in the art according to practical requirements.

In addition, when the home energy control system works normally, the energy storage unit supplies the household devices with power. When there is a fault in the energy storage unit, the power grid or the new energy generating unit provides power to the household devices directly.

The high peak period and the low peak period may be set according to local conditions of power consumption, for example, 8:00-21:00 may be set as the high peak period and 21:00-8:00 of the next day as the low peak period, in some embodiments of the present disclosure. In other embodiments of the present disclosure, the high peak period and the low peak period may be determined by the voltage of the power grid. If the voltage of the power grid has been decreased obviously during a first period, the first period is the high peak period. If the voltage of the power grid is constant during a second period, the second period is the low peak period.

Figure 5:
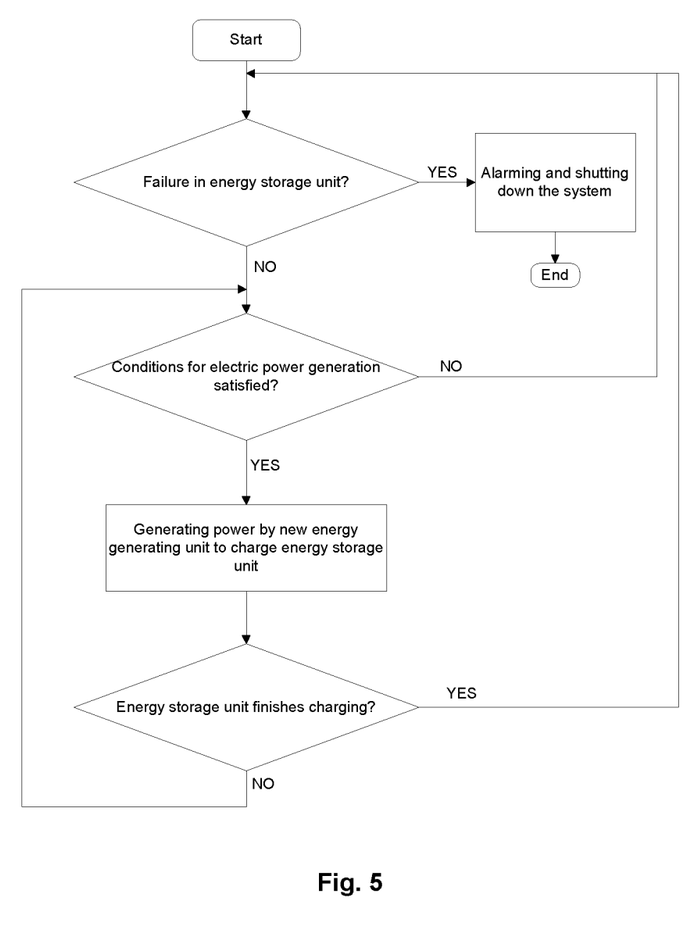
FIG. 5 is a flow chart of a method of controlling a home energy control system when running in a new energy generating mode shown in FIG. 2.

According to an embodiment of the present disclosure, as shown in FIG. 5, the step of controlling the home energy control system to run in the new energy generating mode comprises the following steps.

When the home energy control system is started in step 501 and it is determined whether there is a fault in the energy storage unit in step 503, if yes, the home energy control system gives alarm and is stopped in step 505; otherwise, it is determined whether the conditions for power generation from new energy resources are satisfied in step 507. If the conditions are satisfied, the new energy generating unit is controlled to generate power to charge the energy storage unit in step 509, otherwise, the new energy generating unit is stopped in step 508 and it is started to determine whether there is a fault in the energy storage unit in step 503 again. It is determined whether the charging of the energy storage unit is finished or not in step 511 which is performed simultaneously with step 509, if yes, the new energy generating unit is stopped and it is started to determine whether there is a fault in energy storage unit in step 503 again, otherwise, the operation in steps 507 and 509 is continued.

Figure 4:
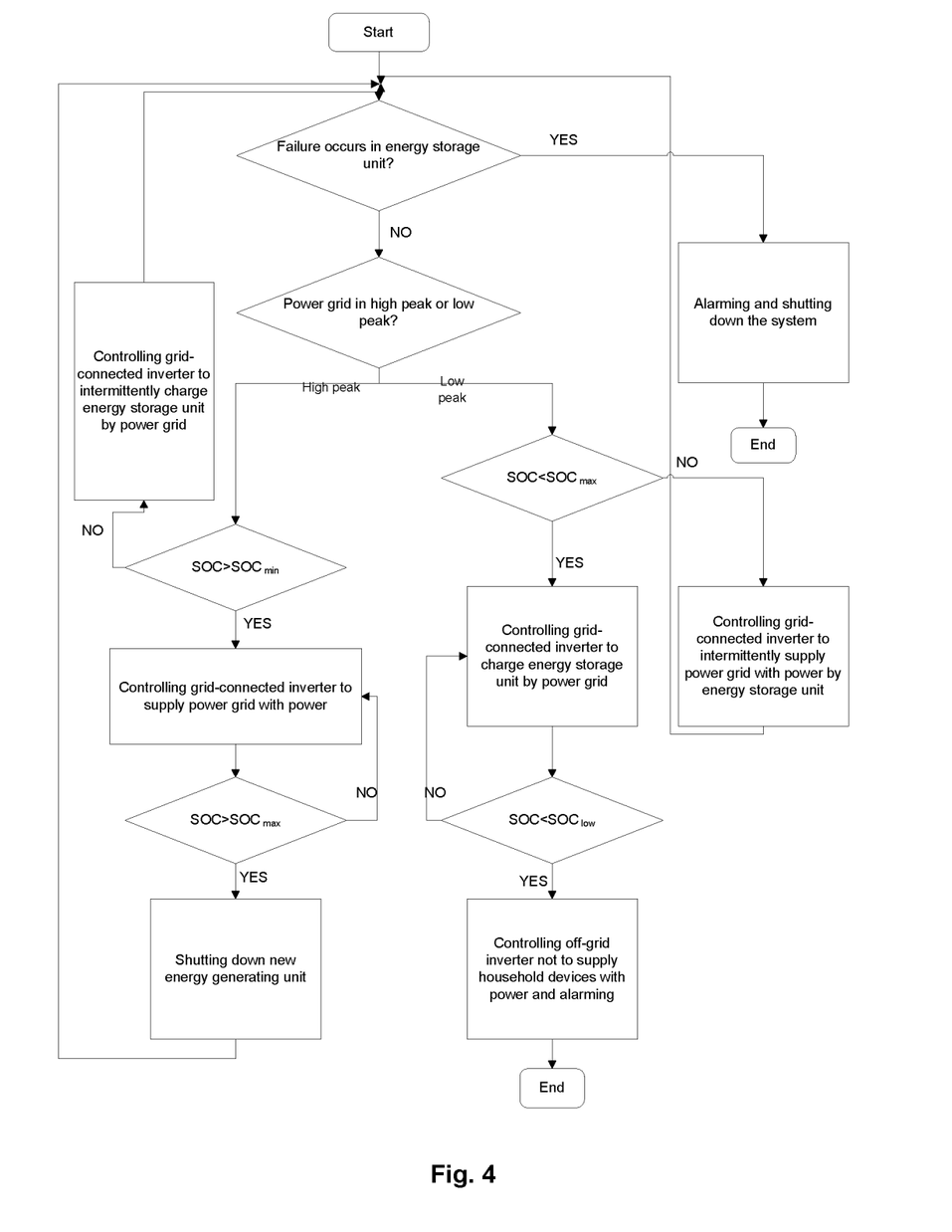
FIG. 4 is a flow chart of a method of controlling a home energy control system when running in a grid-connected inverter mode shown in FIG. 2.

According to an embodiment of the present disclosure, as shown in FIG. 4, the step of controlling the home energy control system to run in the grid-connected inverter mode comprises steps of:

e) determining whether the power grid is in a high peak or a low peak according to the electricity consumption of the power grid in step 408;

e-1) if it is determined by the controller that the power grid is in a high peak, the energy storage unit supplying power to the power grid intermittently or continuously under the control of the grid-connected inverter based on the current SOC of the energy storage unit in step 410;

e-2) otherwise if it is determined by the controller that the power grid is in a low peak, charging the energy storage unit by the power grid intermittently or continuously under the control of the grid-connected inverter based on the current SOC of the energy storage unit.

According to an embodiment of the present disclosure, the step e-1) comprises steps of: e-1-1) when it is determined by the controller that the power grid is in a high peak and the current SOC of the energy storage unit is greater than the first preset value $SOC_{min}$, the energy storage unit charging the power grid under the control of the grid-connected inverter in step 418;

e-1-2) otherwise, charging the energy storage unit by the power grid intermittently under the control of the grid-connected inverter until the current SOC of the energy storage unit is greater than the first preset value $SOC_{min}$ in step 414.

In some embodiments of the present disclosure, the current SOC in step e-1-2) may be set as a value which is a little greater than the first preset value $SOC_{min}$, for example, 1.1 times as large as the first preset value $SOC_{min}$, so that the current SOC may be controlled between 1 and 1.1 times as large as the first preset value $SOC_{min}$.

The step e-1-1) of charging the power grid under the control of the grid-connected inverter comprises a step of: when it is determined by the controller that the current SOC of the energy storage unit is greater than the second preset value $SOC_{max}$, stopping the new energy generating unit in step 418.

The step e-1-2) of charging the energy storage unit by the power grid intermittently under the control of the grid-connected inverter further comprises steps of:

f-1), when it is determined by the controller that the power grid is in a low peak and the current SOC of the energy storage unit is smaller than a second preset value $SOC_{max}$ which is larger than the first preset value $SOC_{min}$, charging the energy storage unit by the power grid under the control of the grid-connected inverter in step 422; and f-2), when it is determined by the controller that the power grid is in a low peak and the current SOC of the energy storage unit is no smaller than the second preset value $SOC_{max}$, the energy storage unit supplying power intermittently to the power grid under the control of the grid-connected inverter until the current SOC of the energy storage unit is smaller than the second preset value $SOC_{max}$ in step 424.

According to an embodiment of the present disclosure, the current SOC in the step f-2) may be set as a value which is a little smaller than of the second preset value $SOC_{max}$, for example, 0.9 times as large as the second preset value $SOC_{max}$, so that the current SOC may be controlled between 0.9 and 1 times as large as the second preset value SOC.

The step f-1) of charging the energy storage unit by the power grid comprises a step of: switching the household devices to be powered from the energy storage unit to the power grid under the control of the off-grid inverter when the current SOC of the energy storage unit is lower than a third preset value $SOC_{low}$ which is larger than the first preset value $SOC_{min}$ and smaller than the second preset value $SOC_{max}$ in step 428.

When the current SOC of the energy storage unit is not smaller than the third preset value $SOC_{low}$, especially when the current SOC of the energy storage unit is not smaller than the first preset value $SOC_{min}$, the power grid is controlled to charge the energy storage unit in step 422.

According to an embodiment of the present disclosure, in order to prevent the current SOC from being smaller than first preset value $SOC_{min}$, the current SOC may be determined continually to see whether the current SOC is lower than the first preset value $SOC_{min}$ or not; if yes, the household devices are switched to be powered from the energy storage unit to the power grid under the control of the off-grid inverter.

Figure 3:
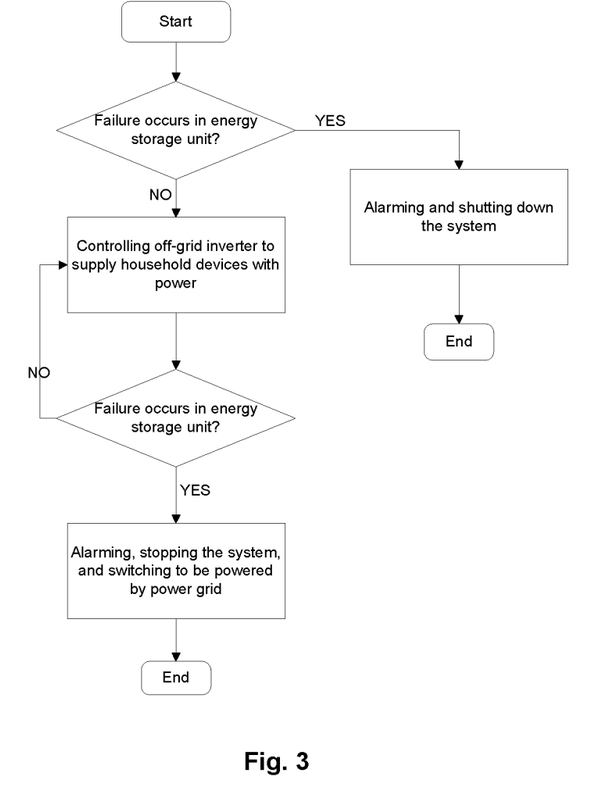
FIG. 3 is a flow chart of a method of controlling a home energy control system when running in an off-grid inverter mode shown in FIG. 2.

According to an embodiment of the present disclosure, as shown in FIG. 3, the step of controlling the home energy control system to run in the off-grid inverter mode comprises steps of:

g-1) determining the temperature, the humidity, the voltage, and SOC of the energy storage unit and determining whether there is a fault in the energy storage unit in step 303;

g-1-1) if there is no fault in the energy storage unit, charging the household devices by the energy storage unit under the control of the off-grid inverter in step 307;

g-1-2) otherwise, alarming and stopping the home energy control system, and charging the household devices by the power grid in step 305.

If there is no fault in the energy storage unit, the energy storage unit is controlled to charge the household devices. Only when there is a fault in the energy storage unit, the power grid is controlled to charge the household devices, or the new energy generating unit is controlled to charge the household devices.

According to an embodiment of the present disclosure, as shown in FIGS. 2-5, the method of controlling the home energy control system may comprise the following steps.

It is determined whether there is a fault in the energy storage unit or not, if yes, an alarm is given and the home energy control system is stopped. If there is no fault in the energy storage unit, it is determined whether manual modulation is desired, if yes, the manual modulation is executed, and other parts of the system may continue working as long as they are not conflicted with the manual operating mode. When the manual modulation is finished, the home energy control system is automatically switched from the manual operating mode to the automatic operating mode. It should be noted that the home energy control system is always operated automatically unless it is controlled to run in the manual operating mode. If no manual modulation is desired, the home energy control system is controlled to run in the automatic operating mode.

When the conditions for power generation are satisfied, the new energy generating unit is controlled to generate power to charge the energy storage unit. If the conditions for power generation are not satisfied, the new energy generating unit is stopped.

When the power grid is in a high peak, if the current SOC is greater than $SOC_{min}$, the power grid is charged by the energy storage unit under the control of the grid-connected inverter in step 412. At this time, if the current SOC of the energy storage unit is greater than $SOC_{max}$, the new energy generating unit is stopped in step 418. If the current SOC of the energy storage unit is not greater than $SOC_{max}$, the power grid is charged by the energy storage unit under the control of the grid-connected inverter in step 412. If the current SOC of the energy storage unit is not greater than $SOC_{min}$, the energy storage unit is charged by the power grid intermittently until the current SOC of the energy storage unit is greater than $SOC_{min}$ in step 414, thus effectively reducing the power cost.

When the power grid is in a low peak period, if the current SOC is smaller than $SOC_{max}$, the energy storage unit is charged by the power grid under the control of the grid-connected inverter in step 422. At this time, if the current SOC of the energy storage unit is smaller than $SOC_{low}$, the household devices are switched to be powered from the energy storage unit to the power grid under the control of the off-grid inverter and an alarm is given in step 428. If the current SOC of the energy storage unit is not smaller than $SOC_{low}$, especially when the current SOC of the energy storage unit is not smaller than the $SOC_{min}$, the energy storage unit is charged by the power grid under the control of the grid-connected inverter in step 422. If the current SOC is not smaller than $SOC_{max}$, the power grid is charged by the energy storage unit under the control of the grid-connected inverter until the current SOC is smaller than $SOC_{max}$, in step 424, thus preventing the energy storage unit from being overcharged.

In some embodiments of the present disclosure, the above steps may be performed in turn or simultaneously during the operation of the home energy control system. Preferably, the above steps may be performed simultaneously, provided that these steps are not conflicted with each other.

With the home energy control system and the method of controlling the same of the present disclosure, the excess power generated by the new energy generating unit may be stored in the energy storage unit, and the operation of the home energy control system may be effectively controlled according to different external conditions, thus expanding the application scope of the home energy control system, effectively utilizing the new energy resources and protecting the environment.

Although explanatory embodiments have been shown and described, it would be appreciated by those skilled in the art that changes, alternatives, and modifications can be made in the embodiments without departing from spirit and principles of the disclosure. Such changes, alternatives, and modifications all fall into the scope of the claims and their equivalents.

What is claimed is:

1. A method of controlling a home energy control system, comprising the steps of controlling the system to run in at least one of the following modes: a new energy generating mode, a grid-connected inverter mode and an off-grid inverter mode after mode conflict check, wherein
   A) in the new energy generating mode, a new energy generating unit is controlled to generate power to charge an energy storage unit;
   B) in the grid-connected inverter mode, the energy storage unit supplies power to a power grid or is charged by the power grid via a grid-connected inverter according to the status of the energy storage unit and power consumption of the power grid; and
   C) in the off-grid inverter mode, household devices are supplied with power from the energy storage unit according to the status of the energy storage unit under the control of an off-grid inverter,
   wherein the method further comprises a step of:
   controlling the system to run in a manual operating mode, wherein
   D) in the manual operating mode, if manual modulation is desired, the energy storage unit, the grid-connected inverter, the off-grid inverter and the new energy generating unit are modulated manually; and if no manual modulation is desired, at least one of the grid-connected inverter mode, the off-grid inverter mode and the new energy generating mode is executed after the mode conflict check;
   wherein when running in the manual operating mode,
   if the manual modulation conflicts with the new energy generating mode, the manual modulation is executed and the new energy generating mode is stopped, otherwise, the manual modulation and the new energy generating mode are executed simultaneously;
   if the manual modulation conflicts with the grid-connected inverter mode, the manual modulation is executed and the grid-connected inverter mode is stopped, otherwise the manual modulation and the grid-connected inverter mode are executed simultaneously; and
   if the manual modulation conflicts with the off-grid inverter mode, the manual modulation is executed and the off-grid inverter mode is stopped, otherwise the manual modulation and the off-grid inverter mode are executed simultaneously,
   in which the conflict between the manual modulation and the new energy generating mode, the grid-connected inverter mode or the off-grid inverter mode means that the manual modulation is identical with the new energy generating mode, the grid-connected inverter mode or the off-grid inverter mode, or influences the new energy generating mode, the grid-connected inverter mode or the off-grid inverter mode.

2. The method according to claim 1 further comprising a step of controlling the system to run in a fault determining mode in which it is determined whether the temperature, the humidity, the voltage, SOC of the energy storage unit is normal before the grid-connected mode, the off-grid inverter mode and/or the new energy generating mode are executed;
   wherein in the fault determining mode, if it is determined that there is a fault in the energy storage unit, the control system is stopped, otherwise at least one of the grid-connected mode, the off-grid inverter mode and the new energy generating mode is executed.

3. The method according to claim 1, wherein when the system is controlled to run in the grid-connected mode, if it is determined that the power grid is in a high peak, the energy storage unit supplies power to the power grid intermittently or continuously under the control of the grid-connected inverter based on the current SOC of the energy storage unit, otherwise if the power grid is in a low peak, the energy storage unit is charged by the power grid intermittently or continuously under the control of the grid-connected inverter based on the current SOC of the energy storage unit; or
   when in the off-grid inverter mode, if it is determined that there is no fault in the temperature, the humidity, the voltage and SOC of the energy storage unit, the household devices are powered by the energy storage unit under the control of the off-grid inverter, otherwise the household devices are powered by the power grid under the control of the off-grid inverter.

4. The method according to claim 3, wherein when the power grid is in a high peak and the current SOC of the energy storage unit is greater than the a first preset value $SOC_{min}$, the energy storage unit charges the power grid under the control of the grid-connected inverter, otherwise the energy storage unit is charged by the power grid intermittently under the control of the grid-connected inverter until the current SOC of the energy storage unit is greater than the first preset value $SOC_{min}$.

5. The method according to claim 3, wherein when the power grid is in a low peak and the current SOC of the energy storage unit is smaller than a second preset value $SOC_{max}$ which is larger than the first preset value $SOC_{min}$, the energy storage unit is charged by the power grid under the control of the grid-connected inverter; and when the power grid is in a low peak and the current SOC of the energy storage unit is not smaller than the second preset value $SOC_{max}$, the energy storage unit supplies power intermittently to the power grid under the control of the grid-connected inverter.

6. The method according to claim 1, wherein the household devices are switched to be powered from the energy storage unit to the power grid under the control of the off-grid inverter when the current SOC of the energy storage unit is lower than a third preset value $SOC_{low}$ which is smaller than the first preset value $SOC_{min}$.

7. A home energy control system, comprising:
an energy storage unit configured to store energy;
a grid-connected inverter connected with the energy storage unit which is configured to transmit power from the energy storage unit to a power grid and/or transmit power from the power grid to the energy storage unit;
an off-grid inverter configured to transmit power from the energy storage unit to household devices;
a new energy generating unit configured to generate power domestically to charge the energy storage unit; and
a controller connected with the energy storage unit, the grid-connected inverter, the new energy generating unit, and the off-grid inverter respectively, the controller being configured to control the energy storage unit, the grid-connected inverter, the off-grid inverter and the new energy generating unit to run in a grid-connected mode, an off-grid inverter mode and/or a new energy generating mode respectively, wherein the controller is further configured to run the system in a manual operating mode;
if the manual modulation conflicts with the new energy generating mode, the manual modulation is executed and the new energy generating mode is stopped by the controller, otherwise, the manual modulation and the new energy generating mode are executed simultaneously;
if the manual modulation conflicts with the grid-connected inverter mode, the manual modulation is executed and the grid-connected inverter mode is stopped by the controller, otherwise the manual modulation and the grid-connected inverter mode are executed simultaneously; and
if the manual modulation conflicts with the off-grid inverter mode, the manual modulation is executed and the off-grid inverter mode is stopped by the controller, otherwise the manual modulation and the off-grid inverter mode are executed simultaneously,
wherein the conflict between the manual modulation and the new energy generating mode, the grid-connected inverter mode or the off-grid inverter mode means that the manual modulation is identical with the new energy generating mode, the grid-connected inverter mode or the off-grid inverter mode, or influences the new energy generating mode, the grid-connected inverter mode or the off-grid inverter mode.

8. The home energy control system according to claim 7, wherein the grid-connected mode is defined by: the energy storage unit supplying power to the power grid or the power grid charging the energy storage unit controlled by the grid-connected inverter according to the status of the energy storage unit and power consumption of the power grid; or the off-grid inverter mode is defined by: household devices being supplied with power from the energy storage unit according to the status of the energy storage unit; or the new energy generating mode is defined by: the new energy generating unit charging the energy storage unit according to the power generating status of the new energy generating unit.

9. The home energy control system according to claim 7, wherein when in the manual operating mode, if manual modulation is triggered, the energy storage unit, the grid-connected inverter, the off-grid inverter and the new energy generating unit are modulated manually by the controller; or if no manual modulation is triggered, the controller controls the system to run in at least one of the grid-connected mode, the off-grid inverter mode and the new energy generating mode after mode conflict check.

10. The home energy control system according to claim 9, wherein the controller is configured to run the system in a fault determining mode in which it is determined whether the temperature, the voltage, and SOC of the energy storage unit is normal before the controller controls the system to run in the grid-connected mode, the off-grid inverter mode and/or the new energy generating mode.

11. The home energy control system according to claim 10, wherein in the fault determining mode, if it is determined that there is a fault in the energy storage unit, the system is stopped by the controller, otherwise the controller controls the system to run in the at least one of the grid-connected mode, the off-grid inverter mode and the new energy generating mode.

12. The home energy control system according to claim 10, wherein when the grid-connected mode is executed, if it is determined by the controller that the power grid is in a high peak, the energy storage unit supplies power to the power grid intermittently or continuously under the control of the grid-connected inverter based on the current SOC of the energy storage unit, otherwise if it is determined by the controller that the power grid is in a low peak, the energy storage unit is charged by the power grid intermittently or continuously under the control of the grid-connected inverter based on the current SOC of the energy storage unit.

13. The home energy control system according to claim 12, wherein when it is determined by the controller that the power grid is in a high peak and the current SOC of the energy storage unit is greater than the a first preset value $SOC_{min}$, the energy storage unit charges the power grid under the control of the grid-connected inverter, otherwise the energy storage unit is charged by the power grid intermittently under the control of the grid-connected inverter until the current SOC of the energy storage unit is greater than the first preset value $SOC_{min}$.

14. The home energy control system according to claim 13, wherein when it is determined by the controller that the power grid is in a low peak and the current SOC of the energy storage unit is smaller than a second preset value $SOC_{max}$ which is larger than the first preset value $SOC_{min}$, the energy storage unit is charged by the power grid under the control of the grid-connected inverter; and when it is determined by the controller that the power grid is in a low peak and the current SOC of the energy storage unit is no smaller than the second preset value $SOC_{max}$, the energy storage unit supplies power intermittently to the power grid under the control of the grid-connected inverter.

15. The home energy control system according to claim 14, wherein the household devices are switched to be powered from the energy storage unit to the power grid under the control of the off-grid inverter when it is determined by the controller that the current SOC of the energy storage unit is lower than a third preset value $SOC_{low}$ which is smaller than the first preset value $SOC_{min}$.

16. The home energy control system according to claim 7, wherein the off-grid inverter mode, the grid-connected mode and the new energy generating mode are executed by the controller to run in series, in parallel or in series and parallel respectively after the mode conflict check.

* * * * *